US010525833B2

(12) United States Patent
Rozman et al.

(10) Patent No.: US 10,525,833 B2
(45) Date of Patent: Jan. 7, 2020

(54) TACTICAL VEHICLE TO GRID ELECTRIC POWER ARCHITECTURE

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 103 days.

(21) Appl. No.: 15/675,859

(22) Filed: Aug. 14, 2017

(65) Prior Publication Data
US 2019/0047433 A1 Feb. 14, 2019

(51) Int. Cl.
| H02J 7/00 | (2006.01) |
| B60L 11/18 | (2006.01) |
| B60W 20/00 | (2016.01) |
| B60L 53/65 | (2019.01) |
| B60L 1/00 | (2006.01) |

(Continued)

(52) U.S. Cl.
CPC ........... *B60L 11/1842* (2013.01); *B60L 1/006* (2013.01); *B60L 53/65* (2019.02); *B60L 55/00* (2019.02); *B60L 58/12* (2019.02); *B60W 20/00* (2013.01); *B60L 2210/10* (2013.01); *B60L 2230/16* (2013.01); *B60L 2240/72* (2013.01)

(58) Field of Classification Search
USPC .................................................. 320/104, 109
See application file for complete search history.

(56) References Cited

U.S. PATENT DOCUMENTS

| 5,343,971 A | 9/1994 | Heidelberg et al. |
| 7,406,370 B2 | 7/2008 | Kojori et al. |
| 7,439,634 B2 | 10/2008 | Michalko |
| (Continued) | | |

FOREIGN PATENT DOCUMENTS

EP        3290257 A2    3/2018

OTHER PUBLICATIONS

Hancock, Janie, et al. "Tactical Vehicle to Grid and Vehicle to Vehicle Demonstration", 2016 NDIA Ground Vehicle Systems Engineering and Technology Symposium, Power & Mobility Technical Session, Aug. 2-4, 2016, Novi, ML.

(Continued)

*Primary Examiner* — Samuel Berhanu
(74) *Attorney, Agent, or Firm* — Carlson, Gaskey & Olds, P.C.

(57) ABSTRACT

An example electrical power system of a vehicle includes a DC bus operable to power a DC load of the vehicle and a power grid external to the vehicle, a DC power generating system, a multifunctional traction drive system, and a controller. The DC power generating system includes a battery, and a first power converter operable in an active rectification mode, an inverter mode, and at least one DC-DC converter mode. The multifunctional traction drive system includes a second power converter operable to cooperate with the DC power generating system for operation in an inverter mode and at least one DC-DC converter mode. The controller is operable to select an output configuration of the battery and an operating mode of each of the first and second power converters according to a plurality of predefined system configurations.

17 Claims, 8 Drawing Sheets

(51) Int. Cl.
  *B60L 55/00* (2019.01)
  *B60L 58/12* (2019.01)

(56) References Cited

U.S. PATENT DOCUMENTS

| | | | |
|---|---|---|---|
| 8,378,641 B2 | 2/2013 | Rozman et al. | |
| 8,427,116 B2 | 4/2013 | Rozman et al. | |
| 9,077,237 B2 | 7/2015 | Ganev et al. | |
| 9,193,273 B1 | 11/2015 | Frank et al. | |
| 9,628,008 B1 | 4/2017 | Fedders et al. | |
| 2010/0133900 A1* | 6/2010 | King | B60L 11/1816 307/9.1 |
| 2012/0013308 A1* | 1/2012 | Briane | H02J 7/02 320/137 |
| 2013/0152816 A1* | 6/2013 | Kral | B60L 3/0061 105/54 |
| 2013/0200846 A1* | 8/2013 | Ang | B60L 11/1816 320/109 |
| 2013/0221921 A1* | 8/2013 | Ang | B60L 11/1811 320/109 |
| 2014/0132073 A1* | 5/2014 | Satake | H02J 1/102 307/64 |
| 2015/0175008 A1* | 6/2015 | Honda | B60L 3/00 701/22 |
| 2015/0217656 A1 | 8/2015 | Loftus et al. | |
| 2016/0114788 A1* | 4/2016 | Kamatani | B60K 6/445 701/22 |
| 2016/0153419 A1* | 6/2016 | Minegishi | F02N 11/0866 290/380 |
| 2017/0033594 A1 | 2/2017 | Rozman et al. | |

OTHER PUBLICATIONS

European Search Report for European Application No. 18188066.7, completed Dec. 17, 2018.

* cited by examiner

| No. | Function | PM | DC GEN. Sys. 12 | | | Traction Drive 14A | | | | | Traction Drive 14B | | | |
|---|---|---|---|---|---|---|---|---|---|---|---|---|---|---|
| | | | Topology | SW1 | | Topology | SW2 | MC | LC | | Topology | SW2 | MC | LC |
| 1 | Engine start/assist | On | PWM Inv. | 2 | | Any | Any | Off | Off | | Any | Any | Off | Off |
| 2 | Active rectification | On | PWM Rect. | 2 | | Any | Any | Off | Off | | Any | Any | Off | Off |
| 3 | Silent mobility mode | Off | DC-DC Boost | 3 | | PWM Inv. | 3 | On | Off | | PWM Inv. | 3 | On | Off |
| 4 | DC bus stabilization 1 | Off | DC-DC Boost | 3 | | Any | Any | Off | Off | | Any | Any | Off | Off |
| 5 | DC bus stabilization 2 | Off | DC-DC Boost | 3 | | DC-DC Boost | 2 | On | Off | | DC-DC Boost | 2 | On | Off |
| 6 | Traction, max mobility | On | PWM Rect. | 2 | | PWM Inv. | 3 | On | Off | | PWM Inv. | 3 | On | Off |
| 7 | Traction, reduced mobility | On | PWM Rect. | 2 | | PWM Inv. | 3 | On | Off | | DC-DC Boost | 2 | On | Off |
| 8 | Pulse power, max | On | PWM Rect. | 1 | | DC-DC Boost | 1 | On | Off | | DC-DC Boost | 2 | On | Off |
| 9 | Pulse power, reduced | On | PWM Rect. | 1 | | DC-DC Boost | 1 | On | Off | | PWM Inv. | 3 | On | Off |
| 10 | DC microgrid | On | PWM Rect. | 1 | | PWM Inv. | Any | Off | On | | DC-DC Boost | 2 | Off | Off |
| 11 | AC microgrid | On | PWM Rect. | 2 | | PWM Inv. | Any | Off | On | | PWM Inv. | Any | Off | On |
| 12 | AC load | On | PWM Rect. | 2 | | PWM Inv. | Any | Off | On | | PWM Inv. | Any | Off | On |

TACTICAL VEHICLE TO GRID ELECTRIC POWER ARCHITECTURE

BACKGROUND

The present disclosure relates to electrical power systems, and more particularly to an electrical power system of a vehicle that can provide power to a power grid external to the vehicle.

Military bases often have a fleet of vehicles, such as armored tactical ground vehicles. In many instances, those vehicles are not on missions for the majority of their life. As more of those vehicles adopt hybrid and range-extended electrical vehicle architectures, it has been proposed use such vehicles to power external loads, such as other vehicles in a vehicle-two-vehicle (V2V) arrangement and/or a power grid in a vehicle-to-grid (V2G) arrangement. In particular, a V2G arrangement is proposed to integrate the vehicle's power generating resources into a small power grid known as a "microgrid."

A microgrid is a localized grouping of electricity sources and loads that can function autonomously from a macrogrid. In the case of some military bases, such as "contingency" military bases which may be set up for short term use, a macrogrid may not be present at all. Using a V2G arrangement to power a microgrid has been proposed to reduce the fuel consumption and/or engine size of standalone generators operating at such military bases.

SUMMARY

An example electrical power system of a vehicle includes a DC bus operable to power a DC load of the vehicle and a power grid external to the vehicle, a DC power generating system, a multifunctional traction drive system, and a controller. The DC power generating system includes a battery, and a first power converter operable in an active rectification mode, an inverter mode, and at least one DC-DC converter mode. The multifunctional traction drive system includes a second power converter operable to cooperate with the DC power generating system for operation in an inverter mode and at least one DC-DC converter mode. The controller is operable to select an output configuration of the battery and an operating mode of each of the first and second power converters according to a plurality of predefined system configurations.

A method of operating an electrical power system of a vehicle is also disclosed.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
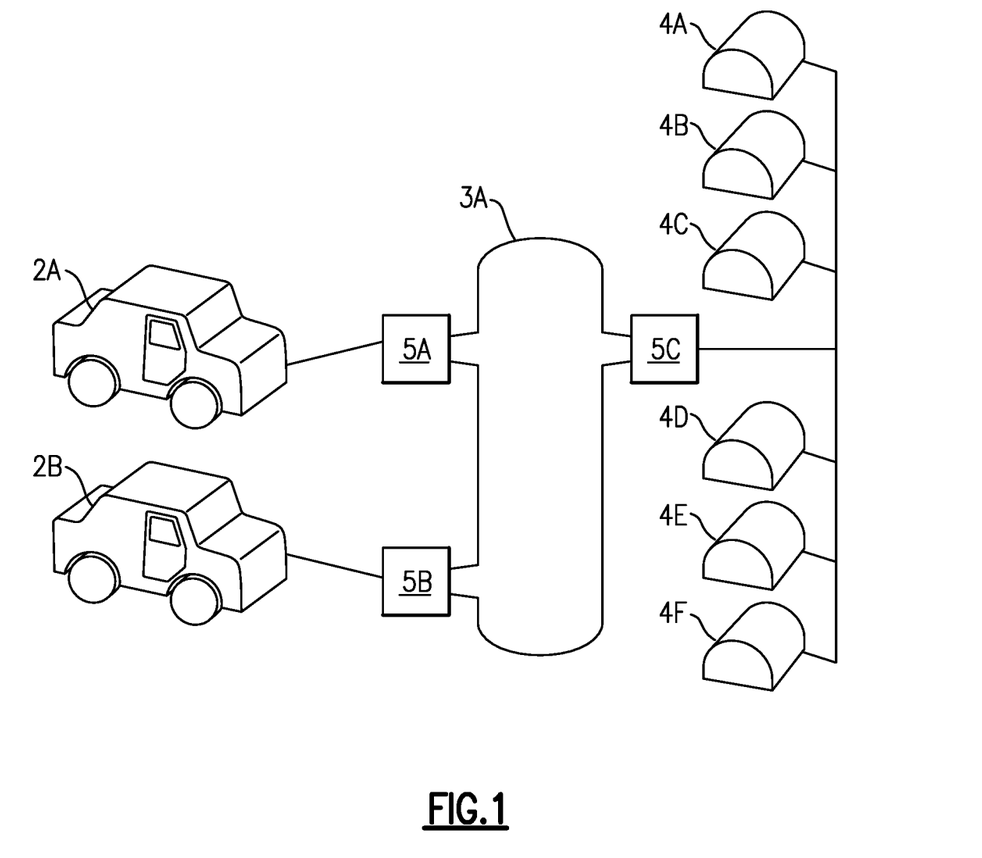
FIG. 1 schematically illustrates a plurality of vehicles that power a microgrid.

FIG. 1 schematically illustrates a plurality of vehicles 2A-B that provide power to a microgrid 3. In some examples, the vehicles 2 are electric or hybrid military ground vehicles. The vehicles 2 may include tactical armored combat vehicles, such as mine-resistant ambush protected (MRAP) vehicles, or may include tanks, for example. Although only two vehicles 2 are shown in FIG. 1, it is understood that other quantities of vehicles could be used (e.g., more than two or less than two). The vehicles 2 are connected to each other in a V2V arrangement for jump starting, or otherwise charging each other's batteries.

The vehicles 2 are also arranged in a V2G arrangement to power the microgrid 3 that is external to the vehicles 2. In some examples, the microgrid 3 is a DC microgrid that includes a DC ring bus portion 3A and also includes a portion 3B that connects the ring bus portion 3A to military base loads 4A-F. A plurality of connectors and/or converters 5A-C may be used to distribute power in the microgrid 3 and/or perform DC-AC or AC-DC conversions. By including a DC-AC converter outside of the vehicles 2 instead of inside the vehicles, vehicle payload can be decreased.

In some examples, the vehicles 2 are hybrid vehicles that include high-voltage (e.g., 300-350 Vdc) energy storage in the form of a capacitor bank and/or battery, and include a high-voltage (e.g., 600-750 Vdc) electrical energy system using a generator driven by a prime mover engine. In the same or other examples, some or all of the vehicles are range-extended electric vehicles.

Figure 2:
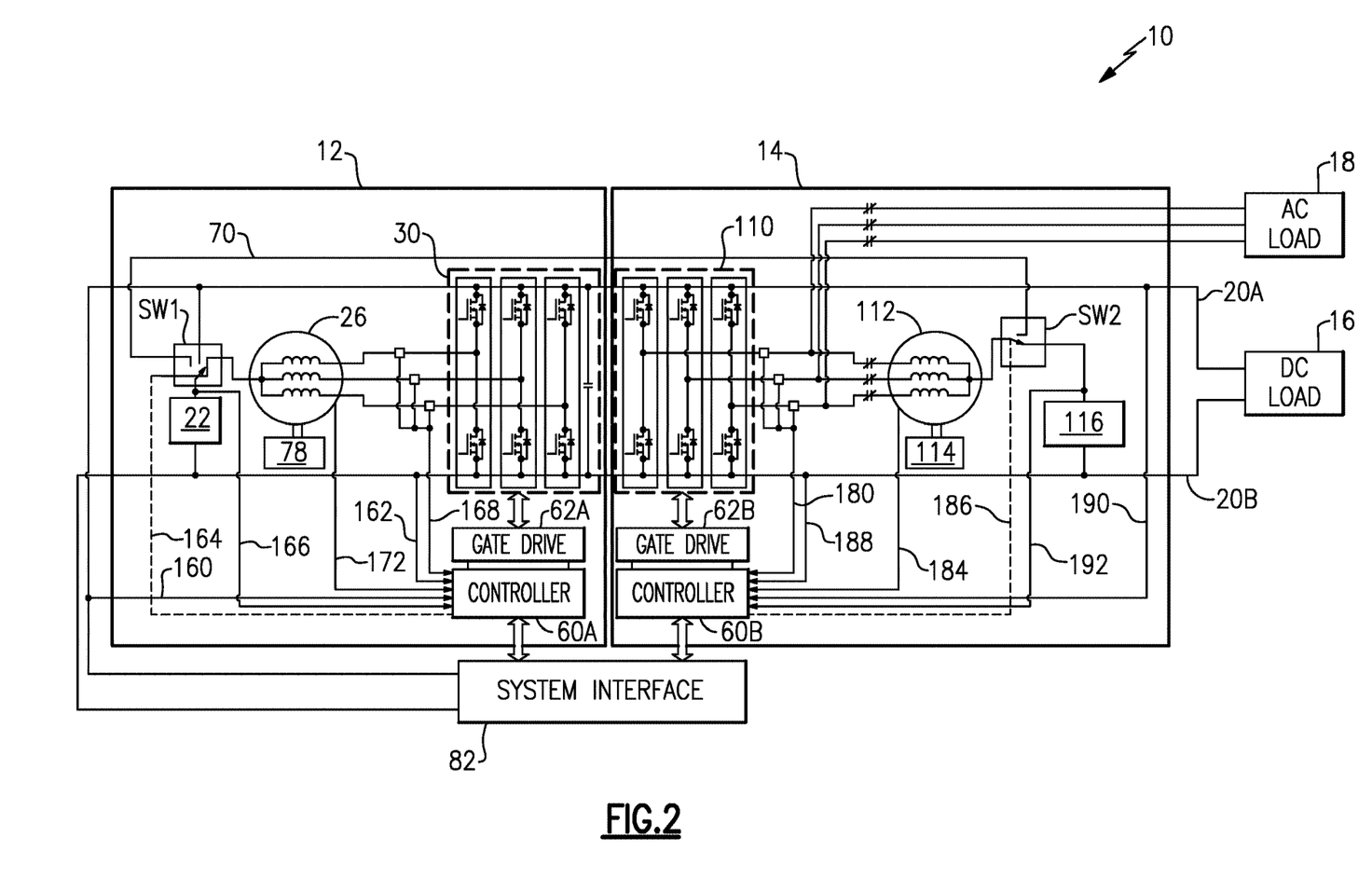
FIG. 2 is a schematic view of an example electrical power system for a vehicle.
Figure 3A:
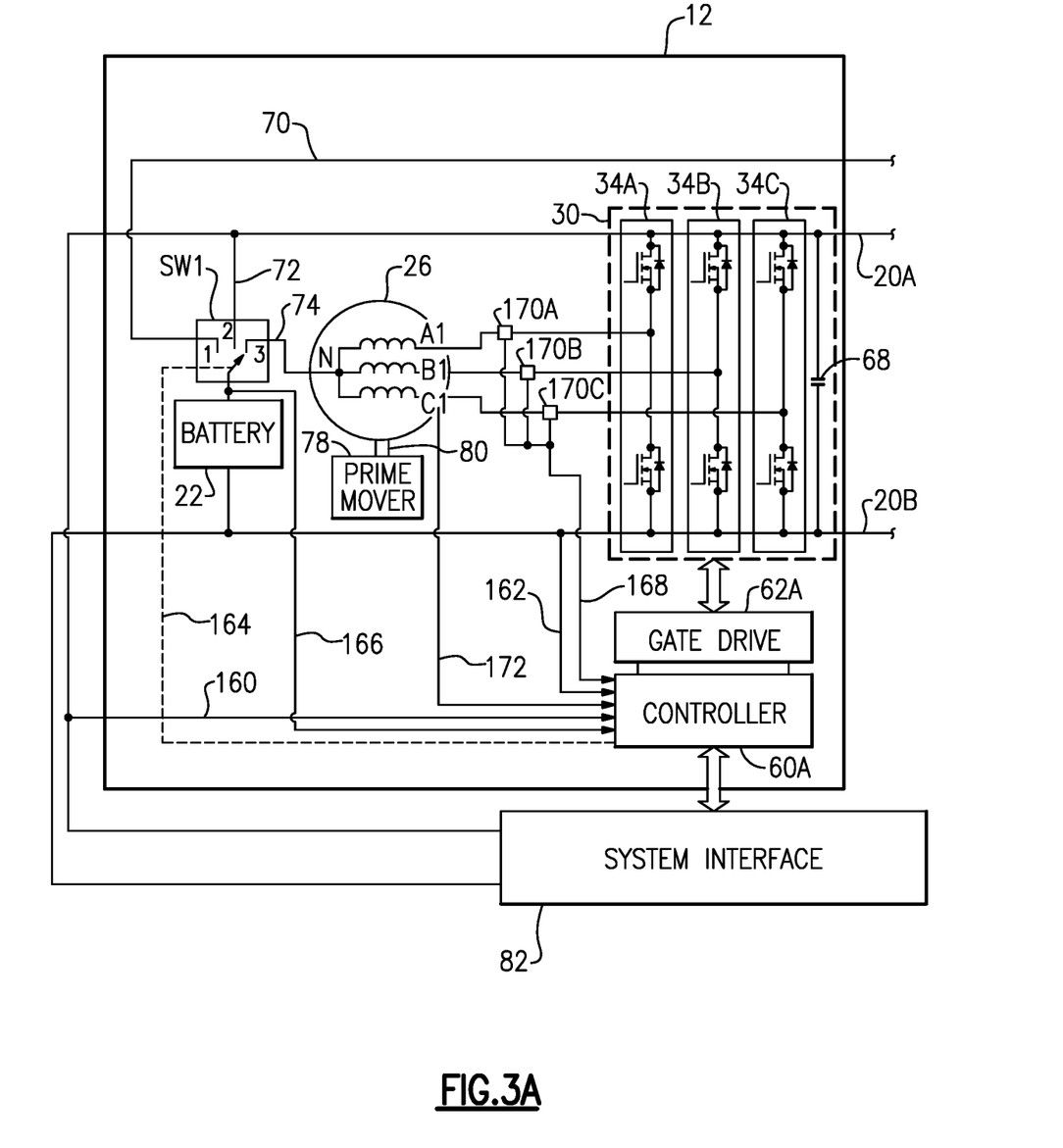
FIGS. 3A-C are schematic views of portions of the system of FIG. 2.
Figure 3B:
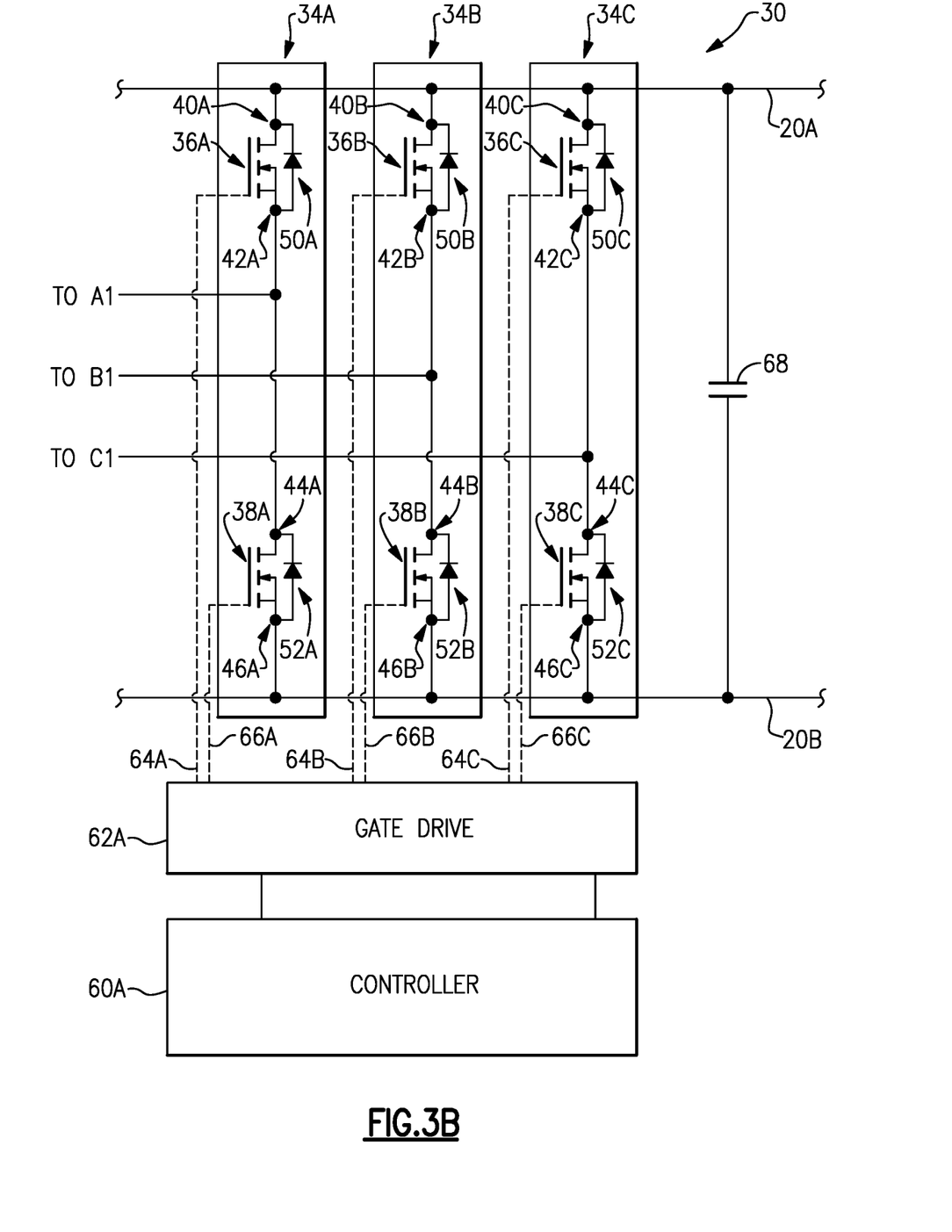
Figure 3C:
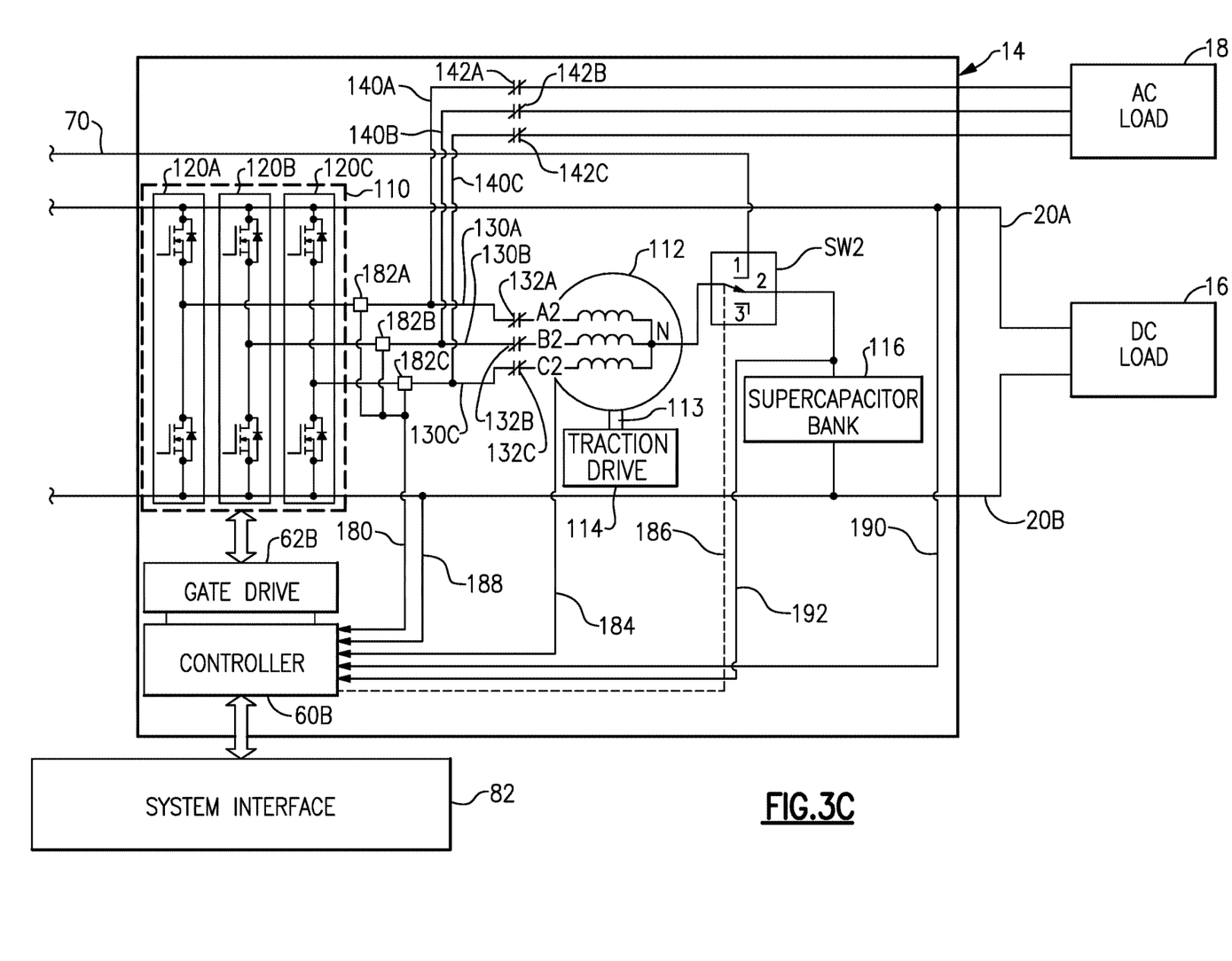

FIG. 2 schematically illustrates an example electrical power system 10 for a vehicle, such as the vehicles 2. FIGS. 3A-C depict enlarged portions of the electrical power system 10 of FIG. 2, and include additional numbering that will be referenced below.

The electrical power system 10 includes a rechargeable battery 22, such as a lithium-ion battery, a supercapacitor bank 116 that includes a plurality of supercapacitors. As used herein, a "supercapacitor" refers to a high-capacity capacitor with capacitance values much higher than other capacitors, and that typically store 10 to 100 times more energy per unit volume or mass than electrolytic capacitors, and can accept and deliver charge much faster than batteries. In one example, each supercapacitor in the supercapacitor 116 has a specific density of 3-10 Wh/kg and an energy density of 14-17 Wh/L. Although not shown in FIG. 2, it is understood that the battery 22 could include an associated battery management system.

Lithium-ion batteries provide long term energy and have a flat discharge curve. Supercapacitors are most effective when a quick charge/discharge are needed to support pulse loads. However, supercapacitors have a linear discharge curve and require a DC-DC converter to help to recover energy in the low voltage band adding additional cost and losses. The supercapacitor bank 116 can charge during certain conditions (e.g., regenerative braking of its vehicle 2), and can discharge during other conditions (e.g., pulse load usage and/or vehicle acceleration). This makes supercapacitors an attractive choice in supporting pulse loads for hybrid and electric vehicles. Combining both a lithium-ion battery and a bank of supercapacitors satisfies requirements of long-term energy and quick charge/discharge, resulting in reduced battery stress and an improved reliability.

The electrical power system 10 also includes a prime mover engine 78 operable to support operation of a first multiphase alternating current (AC) machine 26 in a generator mode. The prime mover engine 78 is an internal combustion engine (e.g., diesel or gasoline) or a gas turbine engine in some examples. The prime mover engine 78 uses fuel from a fuel source (not shown).

The electrical power system 10 uses electrostatic, electrochemical, and chemical types of energy. The supercapacitors in supercapacitor bank 116 are electrostatic devices, and in the example discussed above have a specific density of 3-10 Wh/kg and an energy density of 14-17 Wh/L. The battery 22 is an electrochemical device, and in one example has a specific density of 100-243 Wh/kg and an energy density of 250-731 Wh/L. The prime mover engine 78 uses the chemical energy of its fuel, and in one example has a specific density of approximately 12,880 Wh/kg and an energy density of approximately 9,500 Wh/L. By making optimal use of these different types of energy sources, the vehicle 2 can support V2G and/or V2V configurations.

The electrical power system 10 includes a multifunctional DC electrical power generating system 12, one or more multifunctional traction drive systems 14 (one of which is shown in FIG. 1A, in a "single channel" configuration), a DC load 16, and an AC load 18. The DC power generating system 12 powers the traction drive system 14 and DC load 16 over a DC bus 20 that includes a positive rail 20A and a negative rail 20B, collectively referred to herein as DC bus 20. The battery 22, prime mover engine 78, and AC machine 26 are part of the DC power generating system, and the supercapacitor bank 116 is part of the traction drive system 14.

The DC load 16 can include any combination of one or more vehicle base loads, one or more vehicle pulse (dynamic) loads, and a DC power grid that is external to the vehicle of the electrical power system 10 (e.g., a microgrid). Whether the DC load 16 includes the base load(s), pulse load(s), or power grid depends on an operational state of the vehicle 2 and a configuration of the electrical power system 10. The base load tends to have a more constant power usage, and may include items such as an export inverter (e.g., for plugging in an alternating current (AC) appliance in a vehicle), or a vehicle HVAC system, for example. Pulse loads have a more variable power usage (peak power), and may include items such as a radar, or a laser or microwave-based weapon (e.g., a directed-energy weapon or "DEW").

The AC load 18 may include one or more of an export inverter (e.g., for plugging in an alternating current (AC) appliance in the vehicle 2), a vehicle oil pump, a vehicle compressor, a vehicle cooling fan, or an AC power grid that is external to the vehicle 2 (e.g., an AC microgrid).

The DC peak loads that the vehicle 2 utilizes are supported by the electrical system components of the vehicles 2, including energy storage components and a DC-DC power converter. Additional functionality includes electric engine start from battery 22, a "silent" operating mode to supply DC power from the battery 22 when the prime mover engine 78 is turned-off, and a high power sinewave inverter for internal or external (export inverter) utilization.

The main components of the DC power generating system 12 are the multiphase AC machine 26 which is driven by the prime mover engine 78, the battery 22 with an associated battery management system (not shown), a multifunctional converter 30, a switching circuit SW1 connected to a neutral of the AC machine 26, a controller 60A, and a gate drive 62A.

The multiphase AC machine 26 includes a plurality of stator windings A1, B1, and C1. In one example, the AC machine 26 is a brushless electric machine, such as a permanent magnet synchronous machine (PMSM), and the plurality of windings A1, B1, C1 are arranged in a wye formation. A PMSM uses rotating permanent magnets to provide an electrical field that induces a current in the plurality of stator windings A1, B1, C1. Of course, other AC machines could be used, such ones that can operate as an axial flux machine, a wound field synchronous machine, or an induction machine.

The multifunctional converter 30 includes a plurality of switching legs 34, which are illustrated in greater detail in FIG. 3B. The multifunctional converter 30 described below is a two-level power converter. However, other topologies, such as multilevel power converter could be utilized instead.

Each switching leg 34 includes a pair of power switches 36 and 38, and controls connection of a respective one of the windings A1, B1, C1 of the AC machine 26 to the DC bus 20. In the example of the electrical power system 10, the multifunctional converter 30 is a three-phase device. The first power switch 36 has a first node 40 connected to the positive rail 20A of the DC bus 20 and also has a second node 42. The second power switch 38 has a first node 44 connected to the second node 42 of the first power switch 40, and also has a second node 46 connected to the negative rail 20B of the DC bus 20.

An output of each winding A1, B1, C1 is connected to the nodes 42, 44 of its respective switching leg 34. Each power switch 44 is connected in parallel to an associated freewheeling diode 50, and each power switch 46 is also connected in parallel to an associated freewheeling diode 52. The freewheeling diodes 50, 52 form a current path when their respective power switches 36, 38 are turned off.

The multifunctional converter 30 also includes a DC link capacitor 68 that is connected across the DC bus 20 in parallel to the various switching legs 34. The DC link capacitor 68 reduces DC bus voltage ripple and helps to stabilize the power generating system 12 in presence of constant power (negative impedance) loads.

The controller 60A operates its associated gate drive 62A to control the power switches 36, 38 over control lines 64A-C and 66A-C. Although the power switches 36, 38 are shown as being metal-oxide semiconductor field-effect transistors (MOSFETs) in FIG. 3B, it is understood that other types of power switches could be used, such as insulated-gate bipolar transistors (IGBTs).

Referring to FIG. 3A, a switching circuit SW1 for the battery 22 is operable to connect the battery 22 to any of three different circuit paths 70, 72, 74. In some examples, the switching circuit SW1 includes a three position switch. In a first switching position "1," switching circuit SW1 connects the battery 22 to a bypass line 70 that bypasses the positive rail 20A of the DC bus 20. In a second switching position "2," the switching circuit SW1 connects the battery 22 to the positive rail of the DC bus 20A through circuit path 72. In a third switching position "3," the switching circuit SW1 connects the battery 22 to a neutral N of the AC machine 26 through circuit path 74.

The prime mover engine 78 is operable to rotate a rotor 80 to drive the AC machine 26 to produce AC power while the prime mover engine 78 is running.

The multifunctional converter 30 is operable to utilize the plurality of windings A1, B1, C1 in an inverter mode, an active rectification mode, and at least one DC-DC converter mode (e.g., a boost converter mode and/or a buck converter mode). In particular, the DC power generating system 12 supports the following operating modes:

electric engine start of the prime mover engine 78 from the battery 22 ("inverter mode"), active rectification to supply power to DC bus 20 when the AC machine 26 is driven by the prime mover engine 78, 3-phase interleaved boost converter mode to supply power to the DC bus 20 and operate a traction drive 114 using the battery 22 when the prime mover engine 78 is shut down but the vehicle 2 is moving ("silent" mode), 3-phase interleaved bidirectional buck/boost converter to stabilize voltage on the DC bus 20 during rapid load application/removal using the battery 22 (when the vehicle 2 is stationary), and reconnecting the battery 22 to one of the traction drive systems 14 for DC bus 20 stabilization.

In the "inverter mode" of the multifunctional converter 30, which is also an engine start mode for the prime mover engine 78, the battery 22 is used to start the prime mover engine 78 by supplying DC power via DC bus 206 to the multifunctional converter 30 operating as an pulse width modulated inverter. This starting of the prime mover engine 78 precedes the active rectification mode in which the prime mover engine 78 is running. In the inverter mode, the battery switching circuit SW1 connects the battery directly to the DC bus 20 using circuit path 72.

In particular, in the inverter mode, the controller 60A operates the plurality of switching legs 34A-C of the multifunctional converter 30 as a motor drive pulse-width modulated inverter that converts DC power from the battery 22, as received over the DC bus 20, to a variable voltage variable frequency power to the plurality of stator windings A1, B1, C1. This operates the AC machine 26 in a motoring mode, to rotate rotor 80 and provide electric start of the prime mover engine 78. In one example, the controller 60A uses a field oriented motor control using a known sensorless technique. The controller 60A may optionally use a motor rotor position sensor (not shown) which is operable to detect a position of the rotor 80 of the prime mover engine 78 to perform the engine start. In some examples, the controller 60A is a software-based component that uses software-based controls.

The controller 60A enters the "active rectification" mode of the multifunctional converter 30 once the prime mover engine 78 reaches a threshold speed. In this mode, the battery 22 is connected to circuit path 72, and the multifunctional converter 30 utilizes the plurality of windings A1, B1, C1 and functions as an active pulse width modulated rectifier that rectifies AC power from the AC machine 26 to DC, and supplies the DC power to the DC load 16 and to the battery 22 for charging from the DC bus 20. In particular, the controller 60A performs pulse width modulation on the plurality of switching legs 34A-C to rectify AC from the plurality of windings A1, B1, C1 to DC for the DC bus 20. During this mode, the controller 60A utilizes a field oriented control using a known sensorless technique, optionally using a position sensor (not shown) for rotor 80. In this mode, the plurality of windings A1, B1, C1 are generator synchronous inductances that are used as a coupled boost inductor.

In the "boost converter" mode of the multifunctional converter 30, which occurs during "silent" operation of the vehicle 2, the prime mover engine 78 is turned off, and the DC bus 20 is powered by the multifunctional converter 30 operating as a DC-DC boost converter. In this mode, the battery 22 is connected to the neutral N of the AC machine 26 using circuit path 74. Also, in this mode the multifunctional converter 30 utilizes the plurality of windings A1, B1, C1 and functions as a boost converter to supply DC power to the DC load 16 via DC bus 20 by converting a variable voltage of the battery 22 to a controlled DC bus voltage on the DC bus 20.

During the "boost converter" mode of the multifunctional converter 30, the controller 60A turns off switches 36A-C, and performs pulse width modulation of the switches 38A-C, using an interleaved technique by parallel connection of three channels of boost converters, with each "channel" corresponding to a current phase on a respective one of the windings A1, B1, C1. The controller 60A performs phase shifting of the pulse width modulation frequencies for each phase by 120° between channels. The interleaved technique reduces the total input and output current of the plurality of windings A1, B1, C1, and also significantly reduces input and output current ripple on the DC bus 20 and battery 22.

In the "buck converter" mode of the multifunctional converter 30, the prime mover engine 78 is turned off, and the multifunctional converter 30 utilizes the plurality of windings A1, B1, C1 to decrease a voltage of the DC bus 20 for charging the battery 22. This may be performed when the vehicle 2 is performing regenerative braking, for example. In this mode, the switches 38A-C are turned off, and the controller 60A performs pulse width modulation on the switches 36A-C using the multiphase interleaving technique discussed above, in which a modulation frequency applied to the plurality of windings A1, B1, C1 is offset by 120°.

Referring now to FIG. 3C, an enlarged view of the traction drive system 14 is provided. As shown in FIG. 3C, the multifunctional traction drive system 14 includes a multifunctional converter 110, a multiphase AC machine 112, a traction drive 114, a supercapacitor bank 116, a controller 60B, and a gate drive 62B. The supercapacitor bank 116 includes a plurality of supercapacitors.

The multiphase AC machine 112 includes a plurality of stator windings A2, B2, and C2. As with the AC machine 26, the AC machine 112 can be a brushless electric machine (e.g., a PMSM), an axial flux machine, a wound field synchronous machine, or an induction machine, for example, and its windings A2, B2, C2 can be arranged in a wye formation or other formation.

The multifunctional converter 110 includes a plurality of switching legs 120A-C that are arranged the same as the switching legs 34A-C of multifunctional converter 30 except that the switching legs 120A-C are connected to windings A2, B2, C2 instead of windings A1, B1, C1. Thus, each switching leg 120A-C includes a pair of power switches, and controls connection of a respective one of the windings A2, B2, C2 of the AC machine 112 to the DC bus 20. Each power switch of the switching legs 120A-C is also connected in parallel to a respective freewheeling diode. Although the power switches of the switching legs 120A-C are shown as being metal-oxide semiconductor field-effect transistors (MOSFETs), it is understood that other types of power switches could be used, such as insulated-gate bipolar transistors (IGBTs). An operational state of each switch in the switching legs 120 is controlled by controller 60B through its associated gate drive 62B. In some examples, the controller 60B is a software-based component that uses software-based controls.

Each winding A2, B2, C2 connects to its respective switching leg 120 through a line 130, and each line 130 has a respective main contactor (MC) 132 that can disconnect its respective winding A2, B2, C2 from its respective switching leg 120.

A plurality of respective AC load lines 140A-C connect to the respective lines 130A-C. Each AC load line 140 includes a respective load contactor (LC) 142 that can disconnect its respective load line 140 from the AC load 18.

A switching circuit SW2 controls which of a variety of inputs are connected to a neutral N of the second AC machine 112. In some examples, the switching circuit SW2 includes a three position switch. In a first switching position "1," switching circuit SW2 connects the bypass line 70 to the neutral N of the AC machine 112. In a second switching position "2," the switching circuit SW2 connects the supercapacitor bank 116 to the neutral N of the AC machine 112. A third switching position "3," is an open connection that disconnects both of the bypass line 70 and supercapacitor bank 116 from the AC machine 112.

The second multifunctional converter 110 cooperates with the DC power generating system 12 for operation in an inverter mode and at least one DC-DC converter mode (e.g., a boost mode and/or a buck mode). In particular, the traction drive system 14 supports the following operating modes:

- traction drive for axle or individual wheel of the vehicle 2 (multifunctional converter 110 operated as inverter),
- 3-phase interleaved bidirectional buck/boost converter to stabilize voltage on the DC bus 20 during rapid load application removal using the supercapacitor bank 116, and
- 3-phase interleaved bidirectional buck/boost converter to stabilize voltage on the DC bus 20 during rapid load application/removal using the battery 22 reconnected from the DC power generating system 12.

In the inverter mode, the controller 60B operates the plurality of switching legs 120 as a pulse width modulated inverter to cause the multiphase AC machine 112 to operate as a motor and drive a rotor 113 that drives traction drive 114, in the same or a similar fashion to how the multifunctional converter 30 operates during its inverter mode.

In a boost converter mode, during which either battery 22 (through bypass line 70) or supercapacitor bank 116 is connected to the neutral N of AC machine 112, the controller 60B operates the plurality of switching legs to utilize the windings A2, B2, C2 and operate as a boost converter in a similar or the same fashion as described above in the boost converter mode of multifunctional converter 30.

In a buck converter mode, during which either battery 22 (through bypass line 70) or supercapacitor bank 116 is connected to the neutral N of AC machine 112, the controller 60B operates the plurality of switching legs to utilize the windings A2, B2, C2 and operate as a buck converter in a similar or the same fashion as described above in the buck converter mode of multifunctional converter 30.

When the vehicle 2 is connected to a DC ring microgrid, the DC power generating system 12 supports the following additional functions:

- droop control to improve load sharing between multiple traction drive systems 14 as a low cost decentralized method, and
- active damping to improve system stability in the presence of constant power load (CPL).

The principle of droop control is to reduce the DC voltage reference with increasing output current using linear or non-linear methods. Active damping using feedback loops to stabilize the active rectifier or DC-DC converter.

The controllers 60A-B communicate with a system interface 82 that may also communicate with other vehicle controls (not shown) for controlling or reporting on the electrical power system 10.

Although only one multifunctional traction drive system 14 is shown in FIG. 2, it is understood that the DC power generating system 12 could power a plurality of the traction drive systems 14 through the DC bus 20 and bypass line 70.

Figure 4:
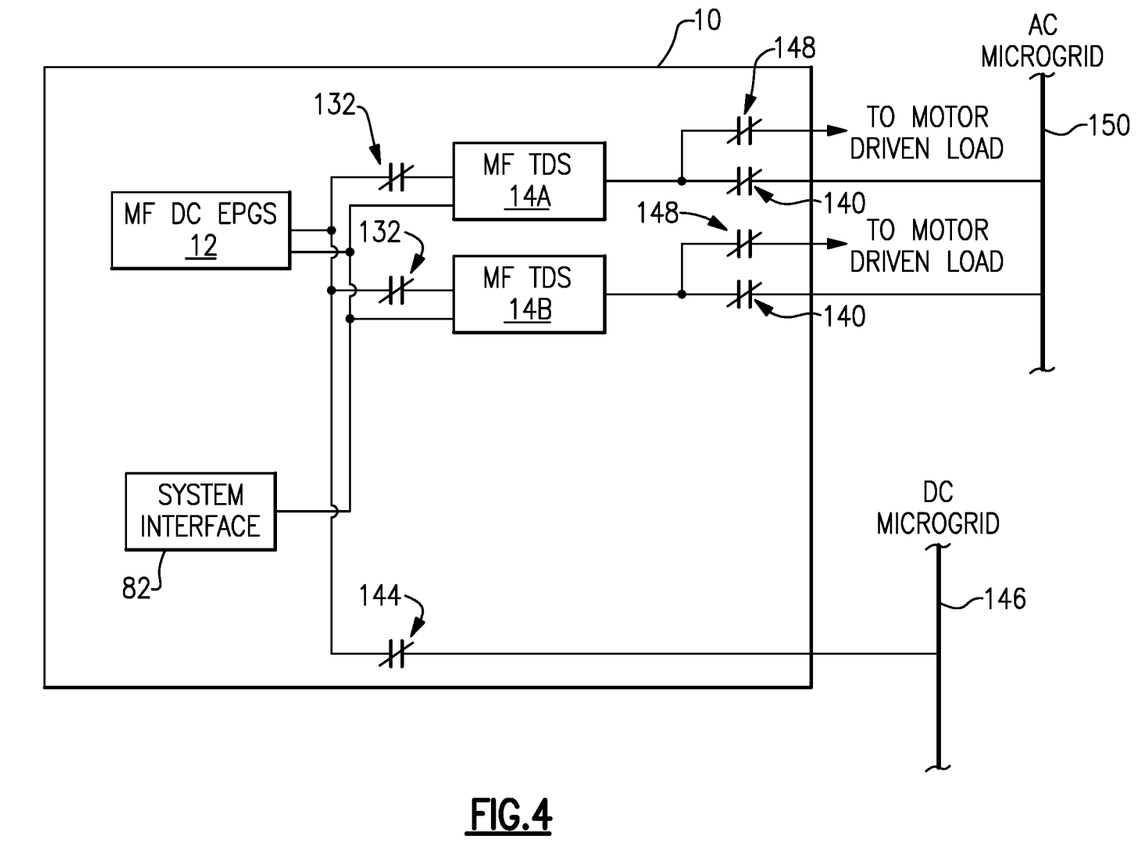
FIG. 4 schematically illustrates an example of an electrical power system that includes a plurality of traction drives.

FIG. 4 schematically illustrates an example of an electrical power system that powers two traction drive systems 14A-B (e.g., one per axle or per wheel of the vehicle 2), which can also be referred to as a two channel traction drive configuration. Contactors 132 control whether their respective multifunctional traction drive systems 14 are used. Contactor 144 controls whether DC microgrid 146 is powered from the DC bus. Contactors 140 control whether their associated traction drive system 14 is used to power an AC microgrid 150, and contactors 148 control whether their associated traction drive system 14 drives operation of a motor-driven load (e.g., traction drive 114).

The controller 60 coordinates operation of the DC power generating system 12 and each multifunctional traction drive system 14. This includes selecting a mode for the first multifunctional converter 30, a mode for the respective multifunctional converter 110 of each traction drive system 14, as well as a switching configuration for the switching circuits SW1 and SW2. These selections are made according to a plurality of predefined system configurations.

Figure 5:
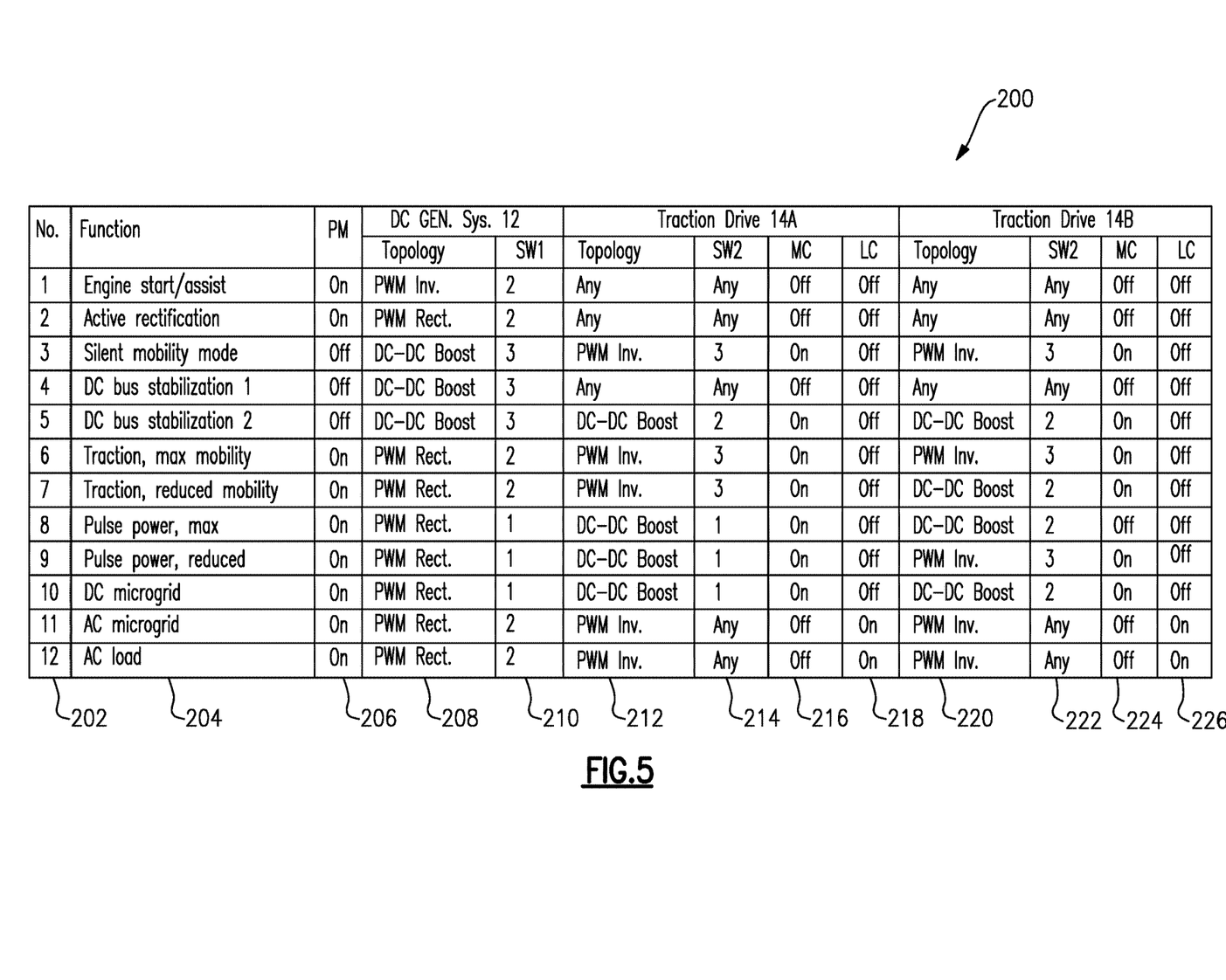
FIG. 5 is a table illustrating a plurality of configurations for the electrical power system of FIG. 2.

FIG. 5 is a table 200 illustrating a plurality of predefined configurations for the electrical power system 10 of FIG. 1. Although twelve particular configurations are illustrated in FIG. 5, it is understood that other configurations could be used as well.

Column 202 indicates a configuration number. Column 204 indicates a function of the configuration (e.g., engine start/assist, active rectification, DC microgrid, etc.). Column 206 indicates whether the prime mover engine 78 is running. Column 208 indicates a topology of the multifunctional converter 30 of the DC power generating system 12. In column 208, "PWM Inv." corresponds to two-level pulse width modulated inverter, "PWM Rect." corresponds to two-level pulse width modulated converter (i.e., rectifier), and "DC-DC Boost" corresponds to a three-phase DC-DC boost converter mode. Column 210 indicates a switch position of the switching circuit SW1.

Columns 212-218 correspond to traction drive system 14A, and columns 220-226 correspond to traction drive system 14B. Columns 212, 220 indicate a topology of the multifunctional converter 110 of their respective traction drive system 14, using the same abbreviations as column 208. Column 214 indicates a switch position of the switching circuit SW2 of traction drive system 14A, and column 222 indicates a switch position a corresponding switching circuit SW2 of traction drive system 14B. Columns 216, 224 indicate whether the main contactor (MC) 132 of each traction drive system 14 is on (closed) or off (open). Columns 218, 226 indicate whether the main contactor (LC) 142 of each traction drive system 14 is on (closed) or off (open).

In the silent mobility mode (3) and the two traction configurations (6), (7), the vehicle 2 is moving. In the remaining configurations listed in FIG. 5, the vehicle 2 is stationary.

As shown in the table 200, the multiple multifunctional traction drive systems 14A-B can be operated the same or differently in the various configurations. In the DC microgrid configuration (11) for example, the prime mover engine 78 is running, the multifunctional switching circuit 30 operates as an active rectifier, and the switching circuit SW1 connects the battery 22 to bypass line 70. Traction drive system 14A connects the bypass line 70 to neutral of its AC machine 112 (SW2=1), so that the multifunctional converter 110A operates as a boost converter for the battery 22. Traction drive system 14B connects its supercapacitor bank 116 to the neutral of its AC machine 112 (SW2=2), so that its multifunctional converter 110B operates as a boost converter for the supercapacitor bank 116. In both traction drive systems 14A-B, the LC contactors are off, which prevents powering of the AC load 18, and the MC contactors are on, which connects each winding of each AC machine 112 to its respective switching leg 120.

As another example, in the maximum mobility traction configuration (6), the prime mover engine 78 is running, and the multifunctional converter 30 utilizes an active rectifier topology to power the DC bus 20. Also, the battery 22 is connected to the DC bus 20 to further power the DC bus. The multifunctional converter 110 of each traction drive system 14 operates as an inverter to operate its respective traction drive 114.

In contrast, in the reduced mobility traction mode (7), the DC power generating system 12 is configured the same, but the second traction drive system 14B does not operate its traction drive 114. Instead, the second traction drive system 14B operates its multifunctional converter 110 operates as a boost converter for its super capacitor bank 116.

The DC bus stabilization modes (4) and (5) minimize voltage ripple on the DC bus 20 by powering the DC bus 20 from the battery 22.

Although twelve different configurations are shown, it is understood that other configurations could be used, such as a mode for charging the supercapacitor bank 116 in one or both of the traction drive systems 14. In such a mode, the multifunctional converter 110 of the traction drive system 14 whose associated supercapacitor bank 116 is being charged could be operated as a buck converter, for example.

Referring again to FIGS. 2, 3A, and 3C, the electrical power system 10 includes a plurality of lines used by the controllers 60A and/or 60B for controlling and/or sensing in the electrical power system 10. Lines 160, 162 are used to detect and/or measure a voltage on the DC bus 20. Control line 164 is used for controlling an operational state of switching circuit SW1. Lines 162, 166 are used to measure a voltage of the battery 22.

Sensing line 168 is used to detect and/or measure electrical current of the windings A1, B1, C1 from current sensors 170A, 170B, 170C. Although only a single current sensing line 168 is schematically shown, it is understood that each winding A1, B1, C1 may have its own current sensing line 168. Sensing line 172 is used to detect a temperature of the AC machine 26 and/or rotor 80.

Sensing line 180 is used to detect and/or measure an electrical current of the windings A2, B2, C2 from current sensors 182A, 182B, 182C. Although only a single current sensing line 180 is schematically shown, it is understood that each winding A2, B2, C2 may have its own current sensing line 180. Control line 184 is used to detect a temperature of the AC machine 112 and/or a rotor 113. Additional sensing lines (not shown) may be included to detect the rotational positions of rotors 80, 113. Control line 186 is used for controlling an operational state of switching circuit SW2. Lines 188, 190 are used to detect and/or measure voltage of the DC bus 20 (redundant sensing of DC bus 20). Lines 188, 192 are used to detect and/or measure a voltage across the supercapacitor bank 116.

Figure 6:
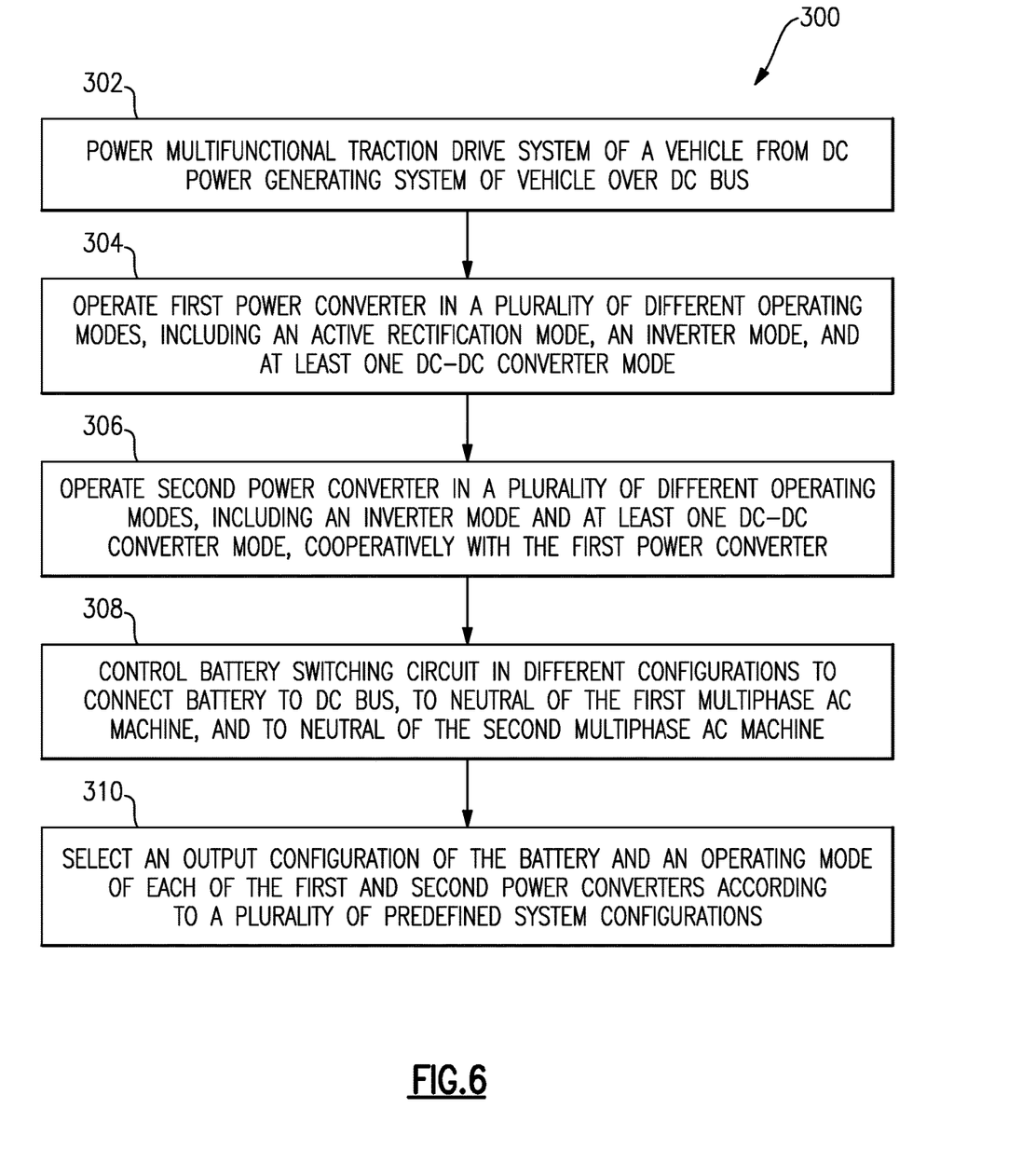
FIG. 6 is a flowchart of an example method of operating an electrical power system of a vehicle.

FIG. 6 illustrates a flowchart 200 of an example method of operating the electrical power system 10. A multifunctional traction drive system 14 of the vehicle 2 is powered from the DC power generating system 12 of the vehicle 2 over the DC bus 20 (block 302). The DC power generating system 12 includes a first power converter (e.g., that includes multifunctional converter 30 and controller 60A), and the multifunctional traction drive system 14 includes a second power converter (e.g., that includes multifunctional converter 110 and controller 60B). The first power converter is operated in a plurality of different operating modes, including an active rectification mode, an inverter mode, and at least one DC-DC converter mode (block 304). The second power converter is operated in a plurality of different operating modes, including an inverter mode and at least one DC-DC converter mode, cooperatively with the first power converter (block 306). Battery switching circuit SW1 is controlled in different configurations to connect the battery 22 to the DC bus 20, to a neutral N of the first multiphase AC machine 26, and to a neutral N of the second multiphase AC machine 112 (block 308). An output configuration of the battery 22 and an operating mode of each of the first and second power converters is selected according to a plurality of predefined system configurations, wherein one such predefined system configuration powers a power grid external to the vehicle from the DC bus 20 (e.g., configuration (10) in FIG. 5).

The electrical power system 10, by combining the electrostatic characteristics of supercapacitors and the electrochemical characteristics of battery 22, provides improved charge and discharge characteristics compared to prior art systems. By utilizing a combination of a generator (AC machine 26), battery 22, and supercapacitor sources of energy to achieve improved dynamic response in DC bus 20, the electrical power system 10 can achieve stabilization in the presence of large peak loads, such as laser or radar loads.

The electrical power system 10 eliminates an external inductor typically used in prior art systems by operating the multifunctional converter 30 to utilize the stator windings A1, B1, C1 of AC machine 26 and function as boost and buck converters, which can provide additional benefits such as size/weight reduction, parts count reduction, and cost savings, and can also reduce electromagnetic interference (EMI). The same benefit is provided by how the AC multifunctional converter 110 uses the windings A2, B2, C2 of the AC machine 112, which eliminates an additional inductor. Thus, the electrical power system 10 reduces the power electronics equipment required to support power quality on the DC bus, and also increases functionality to support off-board vehicle loads.

The inductor elimination can also increase reliability and simplify thermal management, because eliminating the additional DC-DC boost converter can in some examples also facilitate elimination of a dedicated thermal management system of the eliminated boost converter. Additionally, the electrical power system supports the particular export power requirements of the traction drive 114 of each traction drive system 14.

Although a three phase system has been described above that includes three windings in each of the AC machines 26, 112, and three switching legs 34, 120 in each of the multifunctional converters 30, 110, it is understood that this is only an example and that other quantities of phases could be used if desired (e.g., more than three or less than three).

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An electrical power system of a vehicle comprising:
a direct current (DC) bus operable to power a DC load of the vehicle and a DC power grid external to the vehicle;
a DC power generating system comprising a battery, a first multiphase alternating current (AC) machine comprising a plurality of first windings, and a first power converter, the first power converter operable in an active rectification mode, an inverter mode, and at least one DC-DC converter mode, the first power converter including a plurality of first power switches that selectively connect the plurality of first windings to the DC bus; a multifunctional traction drive system comprising a second power converter operable to cooperate with the DC power generating system for operation in an inverter mode and at least one DC-DC converter mode, and a second multiphase AC machine that includes a plurality of second windings, the second power converter including a plurality of second power switches that selectively connect the plurality of second windings to the DC bus;
a bypass line;
a first switching circuit that controls the output configuration of the battery and is operable to:
connect the battery to a neutral of the first multiphase AC machine in the at least one DC-DC converter mode of the first multiphase AC machine;
connect the battery to the DC bus in the inverter and active rectification modes of the first multiphase AC machine; and
connect the battery to a neutral of the second multiphase AC machine via the bypass line when the DC bus powers the DC power grid; and a controller operable to select an output configuration of the battery and an operating mode of each of the first and second power converters according to a plurality of predefined system configurations.

2. The electrical power system of claim 1, wherein in the active rectification mode of the first power converter, the first multiphase AC machine operates as a generator, and the first power converter rectifies current from the generator to supply the DC load over the DC bus, and charges the battery from the current on the DC bus.

3. The electrical power system of claim 2, wherein the at least one DC-DC converter mode of the first power converter comprises a boost converter mode in which the first power converter converts a variable voltage of the battery to a constant voltage on the DC bus.

4. The electrical power system of claim 1, comprising:
a prime mover engine, the first multiphase AC machine driven by the prime mover engine to induce a voltage in the plurality of first windings during the active rectification mode of the first power converter while the prime mover engine is running;
wherein in the inverter mode of the first power converter, the first power converter converts DC power from the DC bus to variable voltage variable frequency AC power to start the prime mover engine; and
wherein the prime mover engine is not running during the at least one DC-DC converter mode of the first power converter.

5. The electrical power system of claim 1, wherein the at least one DC-DC converter mode of the first power converter comprises a buck converter mode in which the first power converter operates as a buck converter that charges the battery using DC power on the DC bus.

6. The electrical power system of claim 1, comprising a second switching circuit that is operable to:
connect a neutral of the second multiphase AC machine to the bypass line while the battery is also connected to the bypass line in a first DC-DC converter mode configuration of the second multiphase AC machine that is a boost converter configuration in which the DC bus powers the DC power grid; and
connect the neutral of the second multiphase AC machine to a capacitor bank in a second DC-DC converter mode configuration of the second multiphase AC machine that is a boost converter configuration for stabilizing a voltage on the DC bus.

7. The electrical power system of claim 1: wherein the power switches of the first power converter are arranged in a plurality of first switching legs, each first switching leg comprising a pair of power switches and controlling connection of a respective one of the first windings to the DC bus; and
wherein the power switches of the second power converter are arranged in a plurality of second switching legs, each second switching leg comprising a pair of power switches and controlling connection of a respective one of the second windings to the DC bus.

8. The electrical power system of claim 7: wherein the multifunctional traction drive system comprises a set of first contactor switches for the plurality of second windings, each first contactor switch controlling connection of its respective winding to its associated second switching leg; and wherein each first contactor switch is open during the active rectification and inverter modes of the first multiphase AC machine, and is closed when the DC bus powers the DC power grid.

9. The electrical power system of claim 8:
wherein the multifunctional traction drive system comprises a set of second contactor switches, each second contactor switch controlling connection a respective one of the second switching legs to a phase of an AC load;
wherein each second contactor switch is open during the active rectification, inverter, and at least one DC-DC mode of the first multiphase AC machine; and
wherein each second contactor is closed and each first contactor is open when the DC bus powers an AC load.

10. The electrical power system of claim 1:
wherein the multifunctional traction drive system is a first multifunctional traction drive system that drives operation of a first traction drive load when the second power converter operates the second multiphase AC machine in a motoring mode;
the electrical power system comprising a second multifunctional traction drive system that comprises a third power converter, and a third multiphase AC machine, and that drives operation of a second traction drive load when the third power converter operates the third multiphase AC machine in a motoring mode.

11. A method of operating an electrical power system of a vehicle, comprising:
powering a multifunctional traction drive system of a vehicle from a direct current (DC) power generating system of the vehicle over a DC bus, wherein the DC power generating system comprises a first power converter that selectively connects a plurality of first windings of a first multiphase alternating current (AC) machine to the DC bus, a battery, and a battery switching circuit, and wherein the multifunctional traction drive system comprises a second power converter that selectively connects a plurality of second windings of a second multiphase AC machine to the DC bus;

operating the first power converter in a plurality of different operating modes, including an active rectification mode, an inverter mode, and at least one DC-DC converter mode;

operating the second power converter in a plurality of different operating modes, including an inverter mode, and at least one DC-DC converter mode, cooperatively with the first power converter;

controlling the battery switching circuit in different configurations to connect the battery to the DC bus, to a neutral of the first multiphase AC machine, and to a neutral of the second multiphase AC machine, wherein a bypass line is used to connect the battery to the neutral of the second multiphase AC machine; and selecting an output configuration of the battery and an operating mode of each of the first and second power converters according to a plurality of predefined system configurations, wherein one such predefined system configuration powers a DC power grid external to the vehicle from the DC bus;

connecting the neutral of the second multiphase AC machine to the bypass line while the battery is also connected to the bypass line in a first DC-DC converter mode configuration of the second multiphase AC machine that is a boost converter configuration when the DC bus powers the DC power grid; and connecting the neutral of the second multiphase AC machine to a capacitor bank in a second DC-DC converter mode configuration of the second multiphase AC machine that is a boost converter configuration for stabilizing a voltage on the DC bus.

12. The method of claim 11, comprising, in the active rectification mode of the first power converter:
operating the first multiphase AC machine as a generator;
operating the first power converter as an active rectifier that rectifies current from the generator to supply one or more DC loads over the DC bus, and
charging the battery from the current on the DC bus.

13. The method of claim 11, wherein the at least one DC-DC converter mode of the first power converter comprises a boost converter mode, the method comprising, in the boost converter mode:

operating the first power converter to convert a variable voltage of the battery to a constant voltage on the DC bus.

14. The method of claim 11, comprising:
operating the first power converter during its inverter mode to convert DC power from the DC bus to variable voltage variable frequency AC power to start a prime mover engine; and
operating the prime mover engine to drive the first multiphase AC machine and induce a voltage in the plurality of first windings of the first multiphase AC machine during the active rectification mode of the first power converter while the prime mover engine is running.

15. The method of claim 11, wherein the at least one DC-DC converter mode of the first power converter comprises a buck converter mode, the method comprising operating the first power converter as a buck converter that charges the battery using DC power on the DC bus.

16. The method of claim 11, comprising:
operating a plurality of first contactor switches that control connection of their respective second winding to a respective switching leg of the second power converter, said operating the plurality of first contactor switches comprising:
opening each first contactor switch during the active rectification and inverter modes of the first multiphase AC machine; and
closing each first contactor switch in the predefined system configuration that powers the power grid external to the vehicle from the DC bus.

17. The method of claim 16, comprising:
operating a plurality of second contactor switches that control connection of a respective one of the second switching legs to a phase of an AC load, wherein said operating the plurality of second contactor switches comprises:
opening each second contactor switch during the active rectification, inverter, and at least one DC-DC mode of the first multiphase AC machine; and
closing each second contactor switch when the DC bus powers an AC load, wherein each first contactor switch is also closed when the DC bus powers the AC load.

* * * * *